Inventor
A. Sönnichsen
By Hazard Downing Siebold
Attys.

United States Patent Office 2,976,394
Patented Mar. 21, 1961

2,976,394

METHOD FOR THE MANUFACTURING OF ELECTRICALLY WELDED TUBES AND IMPROVEMENT IN MEANS FOR SUCH MANUFACTURE

Arne Sönnichsen, Sandakerveien 116, Oslo, Norway

Filed June 13, 1958, Ser. No. 741,940

Claims priority, application Norway June 22, 1957

2 Claims. (Cl. 219—59)

Manufacture of steel tubes by the use of electric welding is usually effected by passing a length of steel strip through suitable rollers to shape the strip to tube form, after which the seam or joint is welded by continuous electric welding.

In this connection, two different arrangements are used in the welding operation. Tubes of high quality, which are adapted to be subjected to high pressures or be used in e.g. boilers, are manufactured in one manner, whereas tubes, the quality of which need not be so high, are manufactured in another manner, at great speed and at less cost.

In the first mentioned method, use is made of two electrodes, each of which is pressed against its individual edge of the seam immediately opposite one another and electric current is caused to flow transversely of the tube and with such high amperage that welding takes place instantaneously.

In order that a satisfactory weld will be obtained, it is necessary to clean the steel strip by a sand blast or acid pickling, after which the edges of the strip are cut clean, so that the abutting edges of the tube seam will be uniform and clean.

Since for all practical purposes, it is necessary to use alternating electric current, the speed of the tube past the electrodes cannot be increased ad libitum without irregularities occurring in the weld seam, since the alternating current varies from zero to maximum in relation to the frequency. Thus, there is a sort of spot welding and a perfect weld can only be obtained when each of these spot welds lies so close to the adjacent ones that the spot welds overlap.

Simultaneously with the welding, the seam is also somewhat upset, and usually the small projecting edge formed thereby is planed off immediately after the welding electrodes.

In this method, only a strip of the tube extending in the longitudinal direction thereof, viz. the weld seam proper, is heated, and stresses of metallurgical nature may occur in the transition from the heated seam to the cold portion of the tube. In order to remove such stresses, the tubes must be passed through an annealing furnace and annealed to make them marketable.

This method of welding tubes is relatively expensive, due in part to the metal which is cut off from the strip edges prior to the welding operation proper and in part to the extra annealing step. At the same time, the speed at which the tubes may be passed through the welding apparatus is limited, as mentioned above. However, tubes of very high quality may be so produced.

In the other method of manufacturing tubes by welding, the steel strip is, in the same manner, formed into tube shape by passing through suitable rollers. In this case, however, two or more electrodes are provided at suitable intervals in the longitudinal direction of the tube and each of these electrodes is so broad that it makes contact with both edges of the joint or seam. When the tube proceeds through the welding machine, the tube is thus successively heated to welding temperature and welding of the seam takes place. In this manner, the entire tube becomes heated and no special annealing operation is necessary.

In industrial plants where it is desirable to be able to manufacture tubes of different qualities, it has hitherto been necessary to install at least two complete sets of machines, one for each of the above mentioned types. This, of course, entails extra expenses in connection with space requirements, and moreover, there will be much machinery which is similar in the two machines, e.g. the shaping rollers.

An object of the present invention is to provide a universal machine adapted for the manufacture of both types of tubes, viz. those of high quality and also of cheaper quality.

According to the invention, this is effected in that following a set of shaping rollers with suitable devices for cutting the strip edges, there is provided a set of electrodes of the first type mentioned above, which effect welding by passing current across the tube seam, and further there is provided another set of electrodes of the second type mentioned above arranged in succession at intervals in the longitudinal direction of the tube, by means of which current may be passed through the tube lengthwise thereof.

For the manufacture of high quality tubes, the second set of electrodes may be used for annealing the tube, whereas for the manufacture of cheaper tubes, the first set of electrodes and the devices for cutting the side edges of the strip may be coupled out.

There is thus provided one single machine for the production of two types of tubes and the costs of a special annealing furnace and of one set of shaping rollers are saved.

Thus the invention consists principally in a method of manufacturing electrically welded tubes in which a steel strip is first shaped into a tube and is thereafter welded by a welding current which passes from an electrode to another transversely of the tube seam and the method is characterized in that annealing of the tube after the welding operation is effected by means of a number of successive electrodes which contact the welded tube, so that the tube is successively heated to the desired temperature.

The invention further consists of an arrangement in an electric tube welding machine comprising rollers adapted to continuously shape a steel strip into a tube shape and electric welding electrodes for heating of the tube seam to welding temperature, characterized in that the machine comprises two electrode sets, each known per se, arranged one behind the other in the direction of movement of the tube through the machine, one of which sets consists of two oppositely arranged electrodes, each in contact with its individual edge of the weld seam and adapted to pass current through the seam transversely to the axial direction of the tube, the other set of electrodes consisting of two or more successive electrodes, each in contact with both sides of the weld seam and adapted to pass current through the tube in the longitudinal direction thereof, and devices for the coupling in or out at will of one or both of said electrode sets. Thus, each of said electrode sets may be used alone or they may be used in combination, so that the machine may be used for tube welding by means of lateral welding current or by means of longitudinal welding current or by means of lateral welding current and longitudinal heating current for annealing of the welded tube.

In order that the invention may be easily understood, it will be described below with reference to the drawing, which diagrammatically illustrates the construction of a machine group according to the invention.

Figure 1:
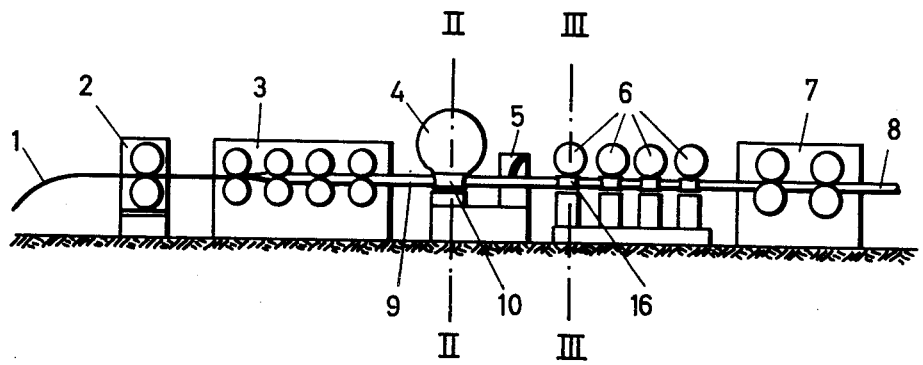
Fig. 1 is a diagrammatic side view of the machine.
Figure 2:
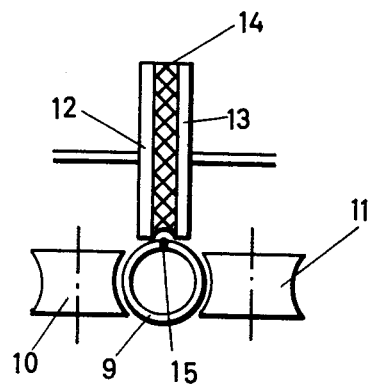
Fig. 2 shows, on a larger scale, a cross section taken along the line II—II of Fig. 1, and, Fig. 3 shows, on the same scale as Fig. 2, a cross section taken along the line III—III of Fig. 1.
Figure 3:
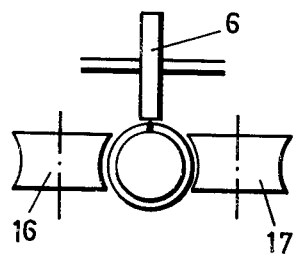

Numeral 1 designates the steel strip or sheet which is fed to the welding machine. The strip first passes between rotary knives 2 adapted to cut the side edges of the steel strip, if desired. The strip then passes to a roller machine 3 in which the strip is shaped to a tube form. In the form of an open tube 9, the strip is thereafter passed between pressure rollers 10, 11 and simultaneously a pair of electrodes 12, 13 is so pressed against the tube strip that the electrode 12 contacts the seam or joint at one edge and the electrode 13 at the other edge thereof. Between the electrodes 12 and 13, there is provided insulating material 14.

The electrode current thus passes through split 15 in the tube whereby welding occurs, while the tube is heated along the weld seam only. Due to the pressure from the rollers 10, 11, a small crest is formed on the top of the tube, and this crest may be removed by means of a knife 5 which planes off the crest. The welded tube passes further to an electrode set 6, which in the embodiment illustrated, consists of four separate electrodes which in a manner known per se are adapted to be displaced axially in relation to the tube for adjusting the desired distance between the separate electrodes.

At this electrode set, there is also provided pressure rollers 16, 17, serving to exert side pressure upon the tube during the treatment thereof with the electrode current.

At the electrode set 6, the current flows from one electrode to the next so that the tube is successively heated in its entire length until it has become completely annealed.

Finally, the tube is passed through a calibrating machine 7, from which product 8 leaves ready for sale.

The arrangement according to the invention thus consists in that to a usual tube welding machine, comprising rollers 3 for forming the strip into tube-shape and an electrode set 6 for heating the tube to welding temperature and a calibrating machine for calibrating the welded tube, there has been added an extra electrode set 4 with a knife 5 and also edge cutting knives 2, so that one may use the elements 2, 3, 4, 5 and 7 for the manufacture of tubes according to a known welding method or the elements 2, 3, 4, 5, 6 and 7 for welding of the tube by means of the electrode set 4 and the annealing of the tube by means of the electrode set 6.

Finally, one may use the elements 3, 6 and 7 only for manufacturing tubes by welding by means of the electrode set 6.

Thus, there is obtained a machine which is not appreciably larger than any one of the two machines, the combination of which forms the present machine, and which may be used for the manufacture of tubes of different qualities and at different production speeds.

Moreover, the electrodes arranged in succession when used for annealing of the tube, constitute a means for accurately controlling the heating in such a manner that the tube, when emerging from the machine, may be passed directly through a calibrating machine to deliver the desired final product.

What I claim is:

1. A method for making electrically welded tubes comprising the steps of forming a steel strip into tubular shape, passing a welding current between electrodes arranged along opposite sides of the seam of the tube for welding the tube transversely, and passing the tube with the welded seam longitudinally respecting single sucsive electrodes spaced axially of the path of movement of the tube and contacting the seam for further welding the seam longitudinally and annealing the tube.

2. An apparatus for making electrically welded tubes comprising means for forming a steel strip into tubular shape, a pair of welding electrodes arranged adjacent the seam, the electrodes being arranged on opposite sides of the seam so that welding current passes between the electrodes transversely of the seam for welding the tube, and a series of single electrodes successively arranged axially of the path of movement of the tube and engageable with the welded seam so that welding currents pass longitudinally of the single electrodes for further welding the seam longitudinally and annealing the tube.

References Cited in the file of this patent

UNITED STATES PATENTS

| | | |
|---|---|---|
| 2,047,254 | Burnish | July 14, 1936 |
| 2,760,042 | Donelan | Aug. 21, 1956 |
| 2,761,939 | Finchelstein et al. | Sept. 4, 1956 |